Feb. 19, 1929.
W. H. GREEN
1,702,257
METHOD OF SOFTENING WATER
Original Filed March 21, 1924
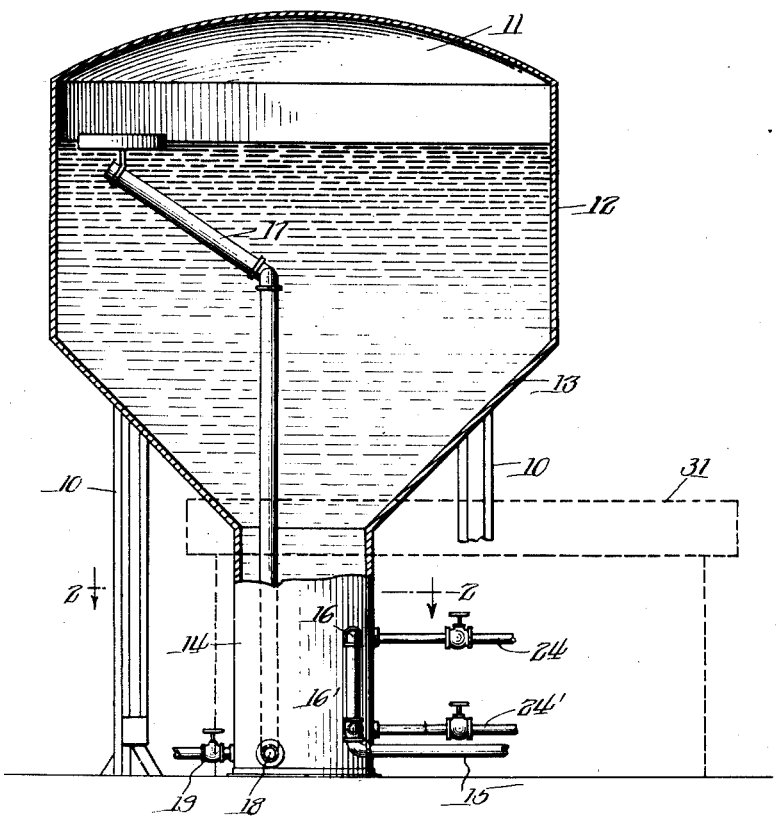
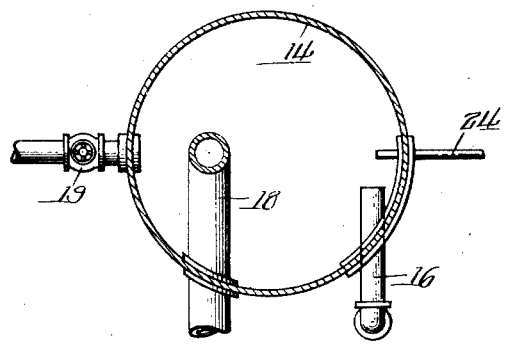
Inventor:
Walter H. Green,
By Cromwell, Greist & Warden
attys.

Patented Feb. 19, 1929.

1,702,257

UNITED STATES PATENT OFFICE.

WALTER H. GREEN, OF CHICAGO, ILLINOIS, ASSIGNOR TO GENERAL ZEOLITE COMPANY, OF CHICAGO, ILLINOIS, A CORPORATION OF ILLINOIS.

METHOD OF SOFTENING WATER.

Original application filed March 21, 1924, Serial No. 700,765. Divided and this application filed October 17, 1927. Serial No. 226,797.

This invention relates to precipitation water softening processes.

In precipitation water softening processes, in which a solution or suspension of lime, or of lime and soda, is mixed with hard water difficulty has been frequently experienced in obtaining complete precipitation and perfect sedimentation. The hard water and precipitating agent are usually mixed with a large amount of agitation and the mixture is caused to travel a tortuous path. As a result the precipitate is caused to form as, or is broken up into, very finely divided particles which are difficult to settle and separate from the undergoing treatment. These fine particles are carried along by the effluent softened water. The soft water, which is then conducted to a boiler, laundry, or some other point of use, therefore contains quantities of finely divided insoluble salts of calcium and magnesium and other hardening constituents in suspension. This suspended material tends to deposit in the pipes and conduits and it also causes undesirable effects at the point of use.

It has been found possible to obtain substantially complete and rapid precipitation and sedimentation by using certain types of precipitation catalysts which cause or accelerate the agglomeration and precipitation of the finely divided suspended particles in the treated water. The previously precipitated particles, flocs, or sludge which have resulted from a previous treatment of hard water with a precipitating water softening reagent such as lime or a mixture of lime and soda are excellent catalysts for this purpose. Not only do these precipitation catalysts greatly hasten the completion of the precipitation and sedimentation, but they also appear to accelerate the reaction between the lime or the lime and soda and the hardening constituents in solution. This subject matter is more fully covered in the copending application, Serial No. 521,213, filed December 9, 1921. In using the previously precipitated sludge as a catalyst it is important not to subject it to too violent an agitation when admixed with the hard water, since if this be done, the previously precipitated particles will tend to break up into a finely divided suspension and add to the difficulties of obtaining complete precipitation and sedimentation.

The object of this invention is to provide a process by means of which hard water can be more satisfactorily softened by precipitation water softening processes.

Another object of this invention is to provide a precipitation water softening process in which a precipitation catalyst is so contacted with the water undergoing treatment that a more complete sedimentation and separation will take place.

A further object of this invention is to provide a continuous water softening process in which hard water can be continuously passed into a treating apparatus and continuously drawn out after it has been completely softened and clarified.

A still further object of the invention is the provision of a process which will be effective to secure thorough mixture of the treating materials with the raw water and expedite the process of sedimentation, thereby attaining a high rate of output.

A still further object of this invention is to provide a precipitation process for softening water, requiring a minimum degree of agitation and disturbance of the water during precipitation and sedimentation.

In the preferred embodiment of this invention, a body of water is admixed with a precipitating reagent, such as a milk of lime or a lime and soda solution, in a cylindrical chamber, in which it is given a rotary motion and in which it is caused to ascend. The raw water may or may not be mixed at the same time with some of the precipitated sludge or flocs. The ascending water is then caused to pass into an expanding chamber so that its rate of ascent will be slowed down. At the same time the body of water will be compelled to occupy an increasingly larger area with the result that the rotary motion will also be slowed down. The water is finally passed into a storage chamber or removed to a point of use. The drawings illustrate one embodiment of the invention.

In the drawings:

Figure 1 is a diagrammatic illustration of an apparatus partly in elevation and partly in sectional elevation; and Figure 2 is a diagrammatic illustration in the nature of a cross section on the line 2—2 of Figure 1.

The supports or columns 10 sustain a large treating receptacle 11 which is in the nature of a tank having an upper portion 12 preferably of cylindrical form, an intermediate portion 13 of downwardly contracting or conical form, and a lower portion 14 of substantially less area than the upper portion 12 and preferably of cylindrical form. The portion 12 serves as a storage space, the conical portion 13 serves as a sedimentation cone and the cylindrical portion 14 serves as a mixing leg and reaction chamber. These three portions are arranged coaxially and with unobstructed communication therebetween. With the receptacle 11 is associated a supply conduit 15 to the mixing leg 14 to which the raw water is supplied under sufficient head or pressure to rise to the necessary elevation in the receptacle. The raw water from this supply conduit is discharged into the mixing leg along the inner wall of the leg in such a fashion as to set up a rotary movement of the water therein (see also Figure 2). An outlet 17 is arranged to discharge water from a proper elevation in the storage space 12, conduit 18 being arranged to convey such water to a desired point of disposal or use. A washout tap 19 is arranged at the bottom of the mixing leg 14 through which the sediment may be discharged from the receptacle 11.

Treating solutions of lime or of lime and soda are discharged into the mixing leg 14 through the pipe 24, the discharge end of which is preferably adjacent the inlet 16 and in the path of the raw water discharged therefrom (see also Figure 2). As shown in Figure 2, the treating solutions are discharged perpendicularly across the path of the incoming hard water.

In operation, the raw water being discharged within the mixing leg 14 from the inlet 16, and the treating solution being discharged in the desired ratio thereto from the pipe 24, they at once commingle and take a rotary course of travel in the mixing leg, which motion is effective to agitate and insure thorough mixture and reaction in water, while it gradually rises as more water is introduced. Upon reaching the lower limit of the sedimentation cone 13, the rising water fills the increased area afforded by that portion of the receptacle. Incident to this spreading out, the water maintains its rotary motion, but its rate of travel upwardly and its speed of rotation are substantially reduced, said reduction continuing as the water rises through the gradually increasing area. The condition thus presented contributes very effectively to rapid sedimentation of matter precipitated by the treating material and suspended in the water, the sediment descending through the ascending body of water and showering down through the relatively rapidly revolving water more recently introduced into the mixing leg, where it exercises an influence contributing to the precipitation and agglomeration of matter suspended therein. The rotary movement of the water in the precipitation and sedimentation zones is effective to prevent the formation of localized currents or flows which would tend to short-circuit water from the mixing leg to the storage drum, and thereby controls the movement of all the water in such fashion as to give it the gradually decreasing rate of progressive flow incident to its rise. From the sedimentation cone 13 the rising water enters the storage drum 12, where it remains in a substantially tranquil state until reaching the elevation of the discharge, through which it is withdrawn. The discharge is shown as float controlled, but it is evident that its elevation may be fixed. Its arrangement is such, however, that water cannot be discharged through it until it has risen to a predetermined level. This subjects all the water passing through the apparatus to treatment of the desired duration. Of course, sedimentation from water in the storage drum may also take place, the precipitate finding its ultimate resting place at the bottom of the mixing leg 14. The accumulated sludge may be flushed out of the mixing leg 14 through the clean out tap 19 at desired intervals.

In instances it may be desirable to mix some of the sludge which has resulted from a previous reaction with the incoming raw water, as under some conditions such procedure has the effect of augmenting the precipitation of suspended matter from the latter, and permits utilization of unused treating material which may have settled in the sludge. To provide for this, an alternative inlet 16' may be provided, entering the leg 14 near its bottom, through which raw water may be introduced from the supply pipe 15 in such fashion that deposits collected in the bottom of the mixing leg are commingled with it. When the apparatus is operated in that fashion the treating material may be introduced through the auxiliary pipe 24', which enters the mixing leg in front of the auxiliary inlet, or it may be introduced above that inlet through pipe 24.

A very advantageous feature of the process resides in the fact that the flow of the water is always upward without abrupt changes of direction and of decreasing velocity. This character of flow not only contributes to the sedimentation of the suspended matter, but also leaves the fully treated water in a position where it may be withdrawn or distributed under its own head. The water has sufficient rotary motion in the mixing leg to cause thorough admixture of the precipitation catalyst and the precipitating reagents with the raw incoming hard water. The velocity of rotation is slowed down constantly so that the water in the sedimentation cone will just have sufficient rotary speed to cause the particles of suspended matter to roll up against each other. This will cause the particles to agglomerate and they will shortly become sufficiently heavy to descend through the ascending water.

The lime and soda or the lime softening treatment involves two general steps or phases, firstly, chemical reaction to cause the impurities to separate out in solid form, and secondly the aggregation of particles, which initially form in a very finely divided state into flocs of appreciable size and weight, which may be removed from the water by sedimentation. The requirements for effective aggregation and sedimentation are that the water in which the finely divided precipitate is present shall be in motion, whereby the particles may come into contact with one another and coalesce, and that the motion shall not be sufficiently violent at any point to cause the aggregate to be broken down after formation. A slow rotary motion of the water being treated appears to assist the aggregation.

The present process fully meets these requirements and moreover provides that a quantity of previously formed, descending precipitate or sludge will constantly contact with the ascending water with the result that the finely divided suspended material just precipitated is gathered up by the descending aggregate forming still larger flocs which will gravitate more readily, thus providing a more efficient sedimentation. This scouring action of the descending precipitate is increased by the concentration that takes place as it falls through the downwardly contracting conical portion and into the relatively small area of the leg 14. This results in the more recently treated water with its smaller suspended particles being subjected to the greatest proportion of sludge.

It will be noted that in the drawing the diameter of the mixing leg 14 is between one-third and one-fourth of the diameter of the upper portion 12. It follows therefore that the speed of ascension in the cylinder 14 will be about nine times to sixteen times the speed of ascension of the liquid in the upper large cylindrical portion 12. It will be especially noted that the ascending rotary motion of the liquid being treated is along an undisturbed spiral path. There is no baffling and the apparatus is so designed that there will be no disturbance to interfere with the softening or sedimentation reactions. During the initial part of the ascension in the cylindrical portion 14, the upward and rotational velocity of the ascending water will remain constant. At the top of the cylindrical portion 14 the intermixture and reaction will be substantially complete and then the sedimentation will take place. During the sedimentation both the upward and rotational velocity will be gradually decreased as the body of water ascends in the vessel until it reaches the outlet adjacent the top thereof.

This application is a division of an application filed March 21, 1924, Serial No. 700,765, and is a continuation in part of application filed December 9, 1921, Serial No. 521,213.

What is claimed is:

1. A water softening process which comprises intermixing a lime-soda solution with a body of hard water which has been set into rotary motion, causing the mixture to ascend and at the same time continually slowing down the rotary movement without disturbing or baffling it.

2. A precipitation water softening process in which the water is treated with a precipitation reagent, is then caused to ascend with a gradually decreasing velocity, and substantially at the commencement of the ascension is given a rotary motion which is gradually slowed down by causing the ascending water to occupy larger areas without disturbing or baffling it.

3. A precipitation water treating process in which the water to be treated and the treating solution are mixed with rotary motion and caused to ascend in a small cylinder and in which after thorough intermixture the rotary motion is caused to spread out slowly and the rate of ascension is decreased gradually by causing the rotating liquid to ascend in a vessel of gradually increasing diameter until the ascending solution occupies an area about 9 to 16 times its area at the time of mixture.

4. A precipitation water treating process in which the water to be treated and the treating solution are mixed with a rotary motion and caused to ascend in a small cylinder and in which the rotational and ascending speed of the intermixture is slowed without eddying and disturbance by causing it to move upwardly through a chamber of gradually increasing diameter, the particles of the mixture ascending along an unbroken spiral path which tends to widen as the elevation increases.

5. A precipitation water treating process in which the water to be treated and the treating solution are mixed with a rotary motion and caused to ascend in a small cylinder and in which the rotational and ascending speed of the intermixture is slowed without eddying and disturbance by causing it to move upwardly through a chamber of gradually increasing diameter, the smallest diameter being proportioned so that the resultant ascending speed of the mixture will not prevent settling therethrough of the larger agglomerates of precipitate but will prevent settling therethrough of the smaller agglomerates of the precipitate and the largest diameter being proportioned so that the resultant ascending speed of the mixture will be sufficiently slow to enable substantially complete settling of the particles of the precipitate.

6. A precipitation water treating process in which the water to be treated and the treating solution are mixed with a rotary motion and caused to ascend in a small cylinder and in which the rotational and ascending speed of the intermixture is slowed without eddying and disturbance by causing it to move upwardly through a chamber of gradually increasing diameter, the more slowly rotating and ascending parts of the mixture near the end of the treating process being contacted with more dispersed and smaller particles of the precipitate and the more rapidly rotating and ascending parts of the mixture near the commencement of the treating process being contacted with more concentrated and larger particles of the precipitate.

7. A precipitation water treating process in which the water to be treated and the treating solution are mixed with rotary motion and caused to ascend in a small cylinder and in which after thorough intermixture the rotary motion is caused to spread out slowly and the rate of ascension is decreased gradually by causing the rotating liquid to ascend in a vessel of gradually increasing diameter, the mixture being formed by causing the stream of water to be treated to enter the cylinder horizontally and adjacent the side of the cylinder and by causing a small stream of the treating solution to pass perpendicularly across such entering stream.

8. A precipitation water treating process in which the water to be treated and the treating solution are mixed with rotary motion and caused to ascend in a small cylinder and in which after thorough intermixture the rotary motion is caused to spread out slowly and the rate of ascension is decreased gradually by causing the rotating liquid to ascend in a vessel of gradually increasing diameter, the completely treated liquid being removed at the top of the body of liquid by overflow without disturbing the rotational upflow.

9. A precipitation water purifying process which comprises intermixing the water and the precipitating reagent, causing it to ascend and rotate rapidly, maintaining a substantially constant rate of ascension and rotation until the intermixture is substantially complete, and then causing the mixture to occupy increasingly larger horizontal area to assist agglomeration and sedimentation.

10. A precipitation water purifying process which comprises thoroughly mixing the water with a precipitating agent and then causing it to ascend and rotate at a continually decreasing speed, the maximum speed being controlled so that it is insufficient to cause suspension of the larger particles of agglomerate and sediment, but sufficient to overcome the effect of gravity upon the finer particles, and the minimum speed being controlled so that it is insufficient to cause suspension of the finer particles of precipitate.

In testimony whereof I have hereunto subscribed my name.

WALTER H. GREEN.